US011258848B1

(12) United States Patent
Viccari et al.

(10) Patent No.: US 11,258,848 B1
(45) Date of Patent: Feb. 22, 2022

(54) LOAD BALANCING REQUESTS SUCH THAT TARGET RESOURCES SERVE A SINGLE CLIENT

(71) Applicant: Amazon Technologies, Inc., Seattle, WA (US)

(72) Inventors: Leonardo Viccari, Shoreline, WA (US); Justin Jon Derby, Seattle, WA (US); Andrew Guenther, Condord, CA (US)

(73) Assignee: Amazon Technologies, Inc., Seattle, WA (US)

( * ) Notice: Subject to any disclaimer, the term of this patent is extended or adjusted under 35 U.S.C. 154(b) by 163 days.

(21) Appl. No.: 16/059,970

(22) Filed: Aug. 9, 2018

(51) Int. Cl.
*H04L 29/08* (2006.01)
*H04L 67/1027* (2022.01)
*H04L 67/1034* (2022.01)
*H04L 45/30* (2022.01)
*H04L 67/141* (2022.01)
*H04L 47/125* (2022.01)

(52) U.S. Cl.
CPC ........ *H04L 67/1027* (2013.01); *H04L 45/306* (2013.01); *H04L 47/125* (2013.01); *H04L 67/1034* (2013.01); *H04L 67/141* (2013.01)

(58) Field of Classification Search
CPC ............. H04L 67/1027; H04L 67/1034; H04L 67/141; H04L 45/306; H04L 47/125
See application file for complete search history.

(56) References Cited

U.S. PATENT DOCUMENTS

| | | | |
|---|---|---|---|
| 6,182,139 B1 | 1/2001 | Brendel | |
| 6,195,680 B1 | 2/2001 | Goldszmidt et al. | |
| 8,509,082 B2 | 8/2013 | Heinz et al. | |
| 2007/0174429 A1* | 7/2007 | Mazzaferri | H04L 67/02 709/218 |
| 2009/0083861 A1 | 3/2009 | Jones | |
| 2014/0351447 A1* | 11/2014 | Annamalaisami | H04L 65/1069 709/227 |
| 2015/0326498 A1* | 11/2015 | Sweeney | H04L 47/822 709/225 |
| 2017/0078402 A1* | 3/2017 | Brooks | H04L 67/42 |
| 2017/0155691 A1* | 6/2017 | Knauft | H04L 67/1097 |
| 2017/0264565 A1* | 9/2017 | Gosselin-Harris | H04L 47/782 |
| 2019/0115998 A1* | 4/2019 | Kujawski | H04W 72/10 |

* cited by examiner

*Primary Examiner* — Jason D Recek
(74) *Attorney, Agent, or Firm* — Robert C. Kowert; Kowert, Hood, Munyon, Rankin & Goetzel, P.C.

(57) ABSTRACT

Various embodiments of methods and apparatus for load balancing requests such that target resources serve a single client are described. In at least some embodiments, a single resource, such as a compute instance, is assigned to only one client, and that single resource is used for all subsequent connections and communications from that client. Some embodiments comprise a resource selection system which provides identifying information of an available resource, in order for a connection to be established between the client and the resource. The resource selection system then removes that identifying information from its memory. In some of these embodiments, a routing layer interfaces with the resource selection system to establish the connection between the client and the available resource. When a client is assigned to a resource, other clients may be prevented from establishing connections with the resource.

20 Claims, 12 Drawing Sheets

LOAD BALANCING REQUESTS SUCH THAT TARGET RESOURCES SERVE A SINGLE CLIENT

BACKGROUND

As the scale and scope of network-based applications and network-based services such as cloud computing services have increased, data centers may house hundreds or even thousands of host devices (e.g., web servers) that need to be load balanced. Conventional load balancers may include multiple network interface controllers (NICs), for example eight NICs, with some of the NICs handling inbound traffic from/outbound traffic to clients and the other NICs handling outbound traffic from/inbound traffic to the host devices (e.g., servers such as web servers) that are being load balanced. Load balancers typically also include logic that implements load balancing techniques such as round robin and/or least connections techniques to select which host device will handle a connection from a client.

In conventional load balancers, clients communicate with selected host devices on connection(s) that pass through the load balancer, and thus the data exchanged between a client and a selected host device in a conventional load balanced system flows through the load balancer. Some conventional load balancers may serve as proxies to the host devices that they front, and thus may terminate connections (e.g., Transmission Control Protocol (TCP) connections) from the clients and send the client traffic to the host devices on connections (e.g., TCP connections) established between the host devices and the load balancer. In other conventional load balancers, the load balancer does not terminate connections from the client and the host device. Instead, connections (e.g., Transmission Control Protocol (TCP) connections) are established between clients and host devices that pass through the load balancer. The load balancer modifies header information (e.g., TCP and IP header information) in packets that pass through the load balancer on the connections to transparently route traffic between the clients and host devices. These load balancers may be viewed as serving as routing/network address translation (NAT) firewalls between the clients and the load balanced host devices.

Figure 1:
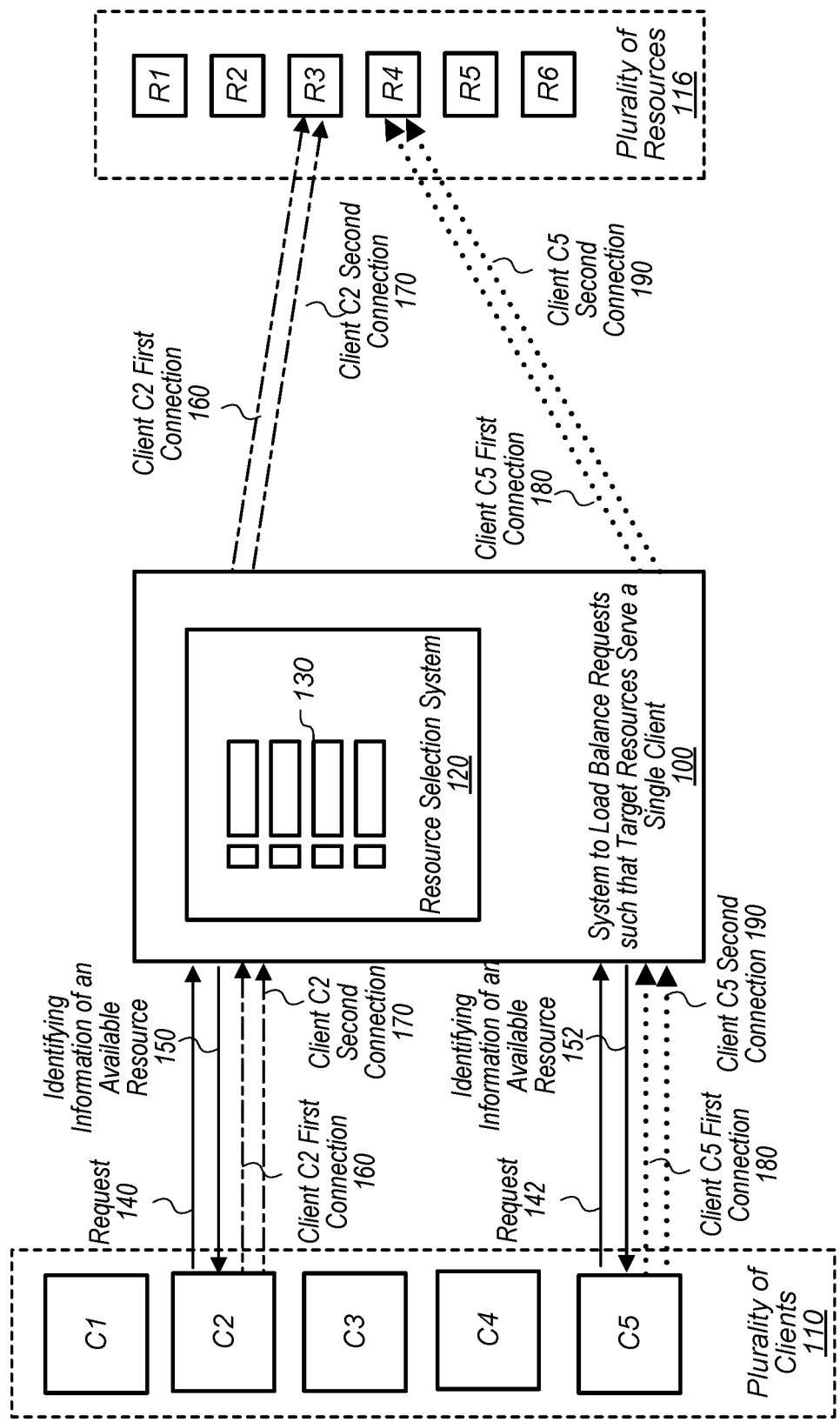
FIG. 1 is an architecture diagram that illustrates an embodiment of a resource selection system that interfaces to a plurality of clients and a plurality of resources.

In the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments of methods and apparatus for load balancing requests such that target resources serve a single client are described. Conventional load balancing is a mechanism to make sure a computing load is distributed somewhat evenly across a fleet of resources. This is an inherently multi-tenant technology, meaning that a given computing resource or instance can and will handle load from multiple clients. Conventional load balancers work by assigning clients to resources, such as compute instances, according to conventional algorithms, like round robin; or by assigning clients to resources that are dealing with the least computing load. However, some technologies and services require that a given resource or instance must be limited to a single client. In other words, two clients cannot share a given resource, such as a computing instance. In addition, these technologies also require "stickiness" in that a given client should be directed to a same target resource for either all or at least some of the client's connections and communications to the fleet of resources. These technologies and services require that a single resource, such as a compute instance, be assigned to only one client, and that the single resource be used for all subsequent connections and communications from that client. Various embodiments described herein can provide these features by load balancing requests such that target resources serve a single client.

At lease some embodiments of the present invention provide the ability to balance the load clients impose on a fleet of resources, such target resources, and also guarantee "stickiness." In addition, the embodiments not only guarantee an even distribution of the load on the fleet of resources, but they also make sure that only a single client is able to use each resource. Some embodiments operate by providing a routing layer or a resource selection system that follows conventional algorithms to assign a client to a resource, but also removes that resource from the fleet when doing so. A session cookie, such as an HTTP cookie, is used for stickiness in some embodiments. Some embodiments provide that whenever a client is assigned to a computing instance, that instance will not accept connections from other clients.

Different embodiment of the present invention can be applied to a variety of different technologies or product offerings that require the features provided. In some embodiments, the "computational resources" are basically browsers running in a provider network, where making sure that a single customer is able to impose load on a remote browser instance is one of a product's fundamental security and privacy guarantees. In some of these embodiments, the technology provides the ability to handle multiple connections from the same client (e.g. to handle multiple browsing tabs). The client-side browsers can be located on a phone or tablet, for example, with rendering instances located in the provider network. In these embodiments, different browsers for different clients can be guaranteed to be handled by different provider network rendering instances. In other embodiments, the technology described herein can be used for remote execution of Android apps on emulators running in the provider network, or for remote execution of Linux applications on docker containers running in the provider network. These embodiments are not limiting, and the technology described herein can be used for any application, technology or product offerings that requires at least some of the features provided.

In some embodiments, there exists a routing-based resource selection system that provides connections from clients to compute instances. In some of these embodiments, there is a plurality of identifications of available resources that can be implemented as a queue, such as, for example, a FIFO queue. In some embodiments, the queue contains entries that indicate browsers in a pool of provider-network based browsers. Whenever a request of a client arrives at the routing-based resource selection system, and the request does not include any identifying information of a provider-network based browser, the routing-based resource selection system is going to request identifying information of an available browser from the queue, and then reserve the specific available browser for the requesting client. Once the queue supplies identifying information of an available browser by popping the information from the queue, the queue will not provide the information for the same queue in response to another request. Therefore, in some embodiments, the resource selection system guarantees that only one browser is reserved for only one client at one time.

In some embodiments this system is implemented as part of a provider network. In some of these embodiments, every customer, where each customer can include a plurality of clients, will have their own dedicated plurality of identifications of available resources. In other embodiments a fleet of resources might be assigned to their own dedicated plurality of identifications of available resources, with different fleets assigned to different dedicated plurality of identifications of available resources. This plurality of identifications of available resources might not include all available resources, but only some or part of the total available resources. As an example, each customer or each fleet of resources can have their own dedicated queue that keeps track of at least some available resources that are dedicated to that customer or fleet. In addition, each customer or fleet might also have their own dedicated resource selection system, where the resource selection system includes the plurality of identifications of at least some the available resources.

In some embodiments, there exists a pool of routers. In some of these embodiments the routers are connected to a load balancer, such as an elastic load balancer ("ELB"), application load balancer ("ALB"), or network load balancer ("ALB"), in order for the load balancer to distribute traffic somewhat evenly to all of the routers. In other embodiments, load balancing is performed by another component, such as a DNS server for example. In other embodiments, no load balancing is performed, with a client communicating directly with the router pool or a router in the router pool. In some of the embodiments that include a DNS server, the DNS server can provide network addresses, such as IP addresses, of the routers to the clients upon request, using some algorithm to distribute the client requests across the fleet of load balancers. For example, a DNS server can use a round-robin algorithm to return an IP address of the next router to the client that makes the next request. The DNS server might use other algorithms to return IP addresses of the routers to the clients, such as randomly providing an IP address of a router to a client upon request.

In some embodiments, the routers all are connected to the queue described above. The routers will route any given connection or session to the appropriate provider-network based browser in the fleet of browsers. Such a configuration allows data to or from each of a client's tabs on a client's browser to be routed through a separate router in the pool of routers, but the data to/from each of the client's tabs will all be sent to or originate from the same provider-network based browser at the backend. In other words, the same client will communicate with the same provider-network based browser for all of a client's different tabs that the client has activated, while data for each tab might be routed through a different router of the pool of routers.

In some embodiments, when a client opens a new browser, a request from the client's browser will be sent to one of the load balancers in a provider network. The load balancers will then use a load balancing algorithm to send the request to one of the routers in a pool of routers. In other embodiments, the client will directly communicate with a router. In some of these embodiments, the client receives the network address of one of the routers in the pool of routers from a DNS server.

In some embodiments, the router will determine that there is no identifying information of a provider-network based browser included in the request. The router will then pop the next identifying information of an available provider-network based browser from the queue. The identifying information can include, for example, the IP address of the browser, the port the browser uses for communication, and an internal session token that the browser requires for communication. In some embodiments, the router will encrypt this identifying information with an encryption key that only the routers have access to, but where every router in the pool of routers has access to the same key. In some embodiments, the identifying information, which in some embodiments might be encrypted and in other embodiments might not be encrypted, is sent to the client as a cookie.

In some embodiments, when the same client requires a new connection to the provider-network based browsers, such as when the client opens a new tab on the client browser, the client will send a communication through the load balancers to a router in the fleet of routers. In some of these embodiments, the load balancers will use a load balancing algorithm to send the request to one of the routers in a pool of routers. In other embodiments, the client will directly communicate with a router. In some of these embodiments, the client receives the network address of one of the routers in the pool of routers from a DNS server. In other embodiments, when the same client requires a new connection to the provider-network based browsers, the client might use the received identifying information to establish a direct connection to the provider-network based browser that is identified in the identifying information. In other embodiments, the client might use the identifying information in order to communicate with a resource, such as a provider-network based browser, not using a direct connection to the resource.

In some embodiments, the client might encrypt some or all of the communication, whether the communication be to a load balancer, or a router, or a resource. The client might encrypt some of all of the communication even if the identifying information has already been encrypted by a router. In other embodiments, the client might digitally sign some or all of the communication, whether the communication be to a load balancer, or a router, or a resource. The client might use some other type of protection or identification system or method in order to provide security for the communication, so that the communication is at least tamper detectible by the receiving party.

In the embodiments where the communication is sent to a router, the router might be the same, but it could be a different router than the router used in the initial request of the client. The communication from the client can include the identifying information, such as the cookie, that was sent to the client in response to the initial request. The router then determines that the communication includes identifying information of a provider-network based browser, for example the included cookie. If the identifying information is encrypted then the router then decrypts it. In some embodiments, the router will decrypt the identifying information using the shared encryption key that only the routers have access to. The router will then establish a connection to the provider-network based browser using the identifying information, such as IP address of the browser and port that the browser uses for communication. In some embodiments, the router will then proxy the data that is sent to/from the client and the specific provider-network based browser.

In some embodiments the identifying information of a browser can include a session token. In some of these embodiments, the browser will create the session token during its startup procedure. The session token can be, for example, a random string that the browser creates. In some embodiments the browser will encrypt this random string using an encryption key that only it knows. In some embodiments, the browser will send this session token to the resource selection system to include in the identifying information of the browser. This identifying information, including the session token, can be received by a router when it queries the resource selection system for identifying information of an available resource. The router can send this identifying information, either encrypted or unencrypted by the router, to the client. When a client makes a future request, or communication, or connection, it can include this identifying information. A router that handles this future request or communication or connection can analyze the identifying information, decrypt it if necessary, and retrieve the session token. This session token can then be passed to the provider-network based browser. The provider-network based browser can then analyze this received session token, and decrypt it if necessary, to determine if it is the same as the original session token that it created. In some embodiments, the browser will compare the decrypted session token to the random string that it created. If the session token does not match, then the browser can, in some embodiments, deny the request or communication or connection and then kill itself.

In some embodiments, when identifying information of an available provider-network based browser is provided by a resource selection system, the resource selection system ensures that the same identifying information is not provided to another router or in response to another request. For example, in the embodiments that include a queue, once the identifying information is popped off the queue in response to a request, it is removed from the queue so that the identifying information is not provided again. In this way the routing logic is prevented from providing identifying information, such as cookies, to two different clients that point to the same provider-network based browser.

In some embodiments, anytime a provider-network based browser is started it sends a communication to the resource selection system to tell the resource selection system that it is available. The resource selection system then includes information about the provider-network based browser in the plurality of identification of available resources. In the embodiments that include a queue, the communication can include, for example, identifying information of the provider-network based browser, and this identifying information can be pushed onto the queue. In some embodiments, whenever a router leases a provider-network based browser to a client, the router will communicate with the provider-network based browser to let the browser know that it has been leased. If the communication fails, then the router might perform a number of retries, in some embodiments, before it discards the provider-network based browser from its procedure, and then requests new identifying information from the resource selection system. In other embodiments it might request new identifying information without any retries.

In some embodiments, the provider-network based browser will start a timer whenever it receives such a communication from a router. In some of these embodiments, if the timer expires without a client connecting to the browser, then the browser will kill itself. In other of these embodiments, if the timer expires without a client connecting to the browser, then the browser will communicate with the resource selection system again to tell the resource selection system that it is available. In some embodiments, this timer can be set to 1 minute.

In some embodiments, the browser keeps a timer of the last action or communication from the client. If there is no connection or communication from the client, for example scrolling or zooming or clicking a link or some other action, before the timer expires, then the provider-network based browser will perform some action. In some embodiments this action might be killing itself, while in other embodiments this action might be deleting all user data, rejecting any future communications from the client, and notifying the resource selection system that it is available again. Therefore, if for example there is a down or overloaded network, or if the client closes all the tabs of a browser, then the browser will perform the action, such as killing itself, after this timer expires. In some embodiments this timer can be set to 15 minutes.

While provider-network based browsers have been used as an example of the resource in the previous explanation, the described technique can be used with any type of resource, and should not be limited to provider-network based browsers. In addition, the previous explanation used a queue as an example of data structure that is used to store a plurality of identifications of available resources. However, the plurality of identifications of available resources are not limited to being stored in a queue, and any type of data structure or memory storage system can be used to store the plurality of identifications of available resources. For example, multiple queues might be used in order to emulate a distributed load balancing technique.

In some embodiments the plurality of identifications of available resources might be ordered to get, for example, an even distribution of active resources that are connected or assigned to clients across a plurality of hosts. For example, in some embodiments, the queue might be ordered to provide for an even distribution of resources. In other embodiments involving other data structures or memory storage systems, the plurality of identifications of available resources might be ordered to provide, for example, an even distribution work among the resources or among the hosts. In some embodiments the ordering might be to effect a round robin distribution of resources among instances or among hosts. In other embodiments the ordering of the plurality of identifications of available resources might be to achieve another objective other than an even distribution of resources.

In some embodiments, multiple data structures, such as multiple queues, might be used, where each data structure handles resources with different capabilities. For example, the routers would request identifying information of an available resource from a data structure that handles resources with higher performance, because the client might, for example, be a desktop instead of a mobile platform. As another example, the data structure might handle resources that are specifically optimized for desktop clients, and if the client is a desktop, the router might request information from that data structure. As another example, if the resources are provider-network based browsers, and it is determined that the client is requesting a webpage that includes video, the embodiment might request identifying information from a data structure that includes provider-network based browsers that process video more efficiently. As another example, if it is determined that the client is a mobile platform, then identifying information might be requested from a data structure that contains includes provider-network based browsers specifically tailored for mobile platforms, or that are less powerful.

Embodiments of Load Balancing Requests such that Target Resources Serve a Single Client Embodiments of load balancing requests such that target resources serve a single client are described that may be implemented on or by a provider network that communicates with a plurality of clients. Load balancing requests such that target resources serve a single client can provide support for no-downtime deployments of a resource stack, for example.

FIG. 1 is an architecture diagram that illustrates an embodiment of a resource selection system that interfaces to a plurality of clients and a plurality of resources. The system to load balance requests such that target resources serve a single client 100 receives requests from clients, such as request 140 from client C2 and request 142 from client C5, and returns identifying information of an available resource, such as information 150 to client C2 and information 152 to client C5. Connections are established between clients and resources, where the connections might be direct connections between the clients and resources, or indirect connections. Other components that are part of the system 100 might be involved in establishing the connection, proxying the connection, and/or routing packets from the client to the resource as part of the connection. The connection might include multiple components in the system 100 that are intermediaries between any communication between the client and the resource. All these embodiments are included in the broad concept of a connection. Examples of connections are Client C2 first connection 160 and Client C2 second connection 170 which are connected to resource R3, and client C5 first connection 180 and client C5 second connection 190 which are connected to resource R4.

The system to load balance requests such that target resources serve a single client 100 includes a resource selection system 120. The resource selection system 120 includes a plurality of identifications of available resources of the plurality of resources 130, which, for example, can be stored in memory or in a specific data structure such as a queue. The resource selection system 120 receives a request for identifying information of an available resource. This request can originate from a variety of different sources in the system 100, depending on the embodiment, or it might come directly from the client, such as request 140 from client C2. The request can take a variety of forms, depending on the embodiment. If the plurality of identifications of available resources 130 is a queue, for example, the request might simply comprise popping the next item off the queue. This request can be associated with a first connection request of a client to a resource in the plurality of resources 116. This first connection request can be, for example, the first connection of client C2 160 or it can be, as another example, for the first connection of client C5 180. Depending on the embodiment, this request can be received from different sources. In some embodiments this request is received from a router service, as one example. In other embodiments this request is received from a discovery service, as another example.

The resource selection system 120 communicates with the plurality of identifications of available resources 130 in order obtain identifying information of an available resource 150, which it can respond to the request with. The resource selection system 120 responds to the entity that requested the identifying information. In one embodiment, this entity can be a router service that comprises part of system 100, for example. In another embodiment, this entity can be a discovery service that comprises part of system 100, for example. In another embodiment the resource selection system might respond directly to a client, such as by response 150 to client C2 or response 152 to client C5. If the identifying information is sent to system 100, then system 100 will provide the identifying information of an available resource back to the client, such as in response 150 to client C2 or response 152 to client C5. After the identifying information of an available resource is provided to the client, then a connection from a client of the plurality of clients 110 can be established to the available resource whose identifying information is provided in the plurality of resources 116. Depending on the embodiment, this connection may be established directly between the client and the resource, or through an intermediary such as a router service. Other components that are part of the system 100 might be involved in establishing the connection, proxying the connection, and/or routing packets from the client to the resource as part of the connection. The connection might include multiple components in the system 100 that are intermediaries between any communication between the client and the resource. All these embodiments, and any other type of communication between a client and the resource, are included in the broad concept of a connection. Examples of this connection are illustrated in FIG. 1 as client C2 first connection 160 and client C5 first connection 180.

In the embodiments shown in FIG. 1, the connections for clients C2 and clients C5 are routed to different resources. This is because the resource selection service 120 removes the provided identifying information of the available resource from its plurality of identifications of available resources 130 in order to prevent other clients from establishing other connections with the provided available resource. Therefore, after the resource selection system 120 provides identifying information of resource R3 in response to a request that is associated with client C2's first connection attempt or request to the plurality of resources 116, for example, then the resource selection system 120 removes identifying information of resource R3 from its plurality of identifications of available resources 130.

When client C5 makes its first connection request, for example, and a request that is associated with client C5's first connection request is received by the resource selection system 120, the resource selection system 120 queries its plurality of identifications of available resources 130 for identifying information of another resource. Since identifying information regarding resource R3 has been removed from the plurality of identifications of available resources 130, the resource selection system responds with the next identifying information regarding the next resource, in this case R4. After the identifying information of resource R4 152 is provided to the client C5, then a first connection 180 from client C5 can be established to the resource R4. Depending on the embodiment, this connection 180 may be established directly between client C5 and resource R4, or through an intermediary or intermediaries, such as a router service and/or a load balancer. Other components that are part of the system 100 might be involved in establishing the connection, proxying the connection, and/or routing packets from the client to the resource as part of the connection. The connection might include multiple components in the system 100 that are intermediaries between any communication between the client and the resource. All these embodiments, and any other type of communication between the client and the resource, are included in the broad concept of a connection.

When client C2 requests a second connection 170 to the plurality of resources, the second connection 170 is established to the same resource R3. Depending on the embodiment, this connection is established in different ways. In some embodiments, client C2 analyzed the identifying information of the available resource that is provided by the system 100. In these embodiments, client C2 can establish a direct connection 170 to resource R3. In other embodiments, client C2 provides the identifying information of the available resource that it has received with a new request for a new session or connection to the system 100. Another service or component in the system 100, which might include a router service, can analyze the identifying information of the available resource that is included by the request from client C2. After analyzing this identifying information of the available resource, the other entity can determine that resource R3 is the destination resource for this connection or session. This other entity can then establish a connection 170 and/or proxy the connection 170 between the client C2 and the resource R3 and/or route packets from the client to the resource as part of the connection. The connection might include multiple components in the system 100 that are intermediaries between any communication between the client and the resource. In the same way, a second connection 190 between client C5 and resource R4 can also be established.

Figure 2:
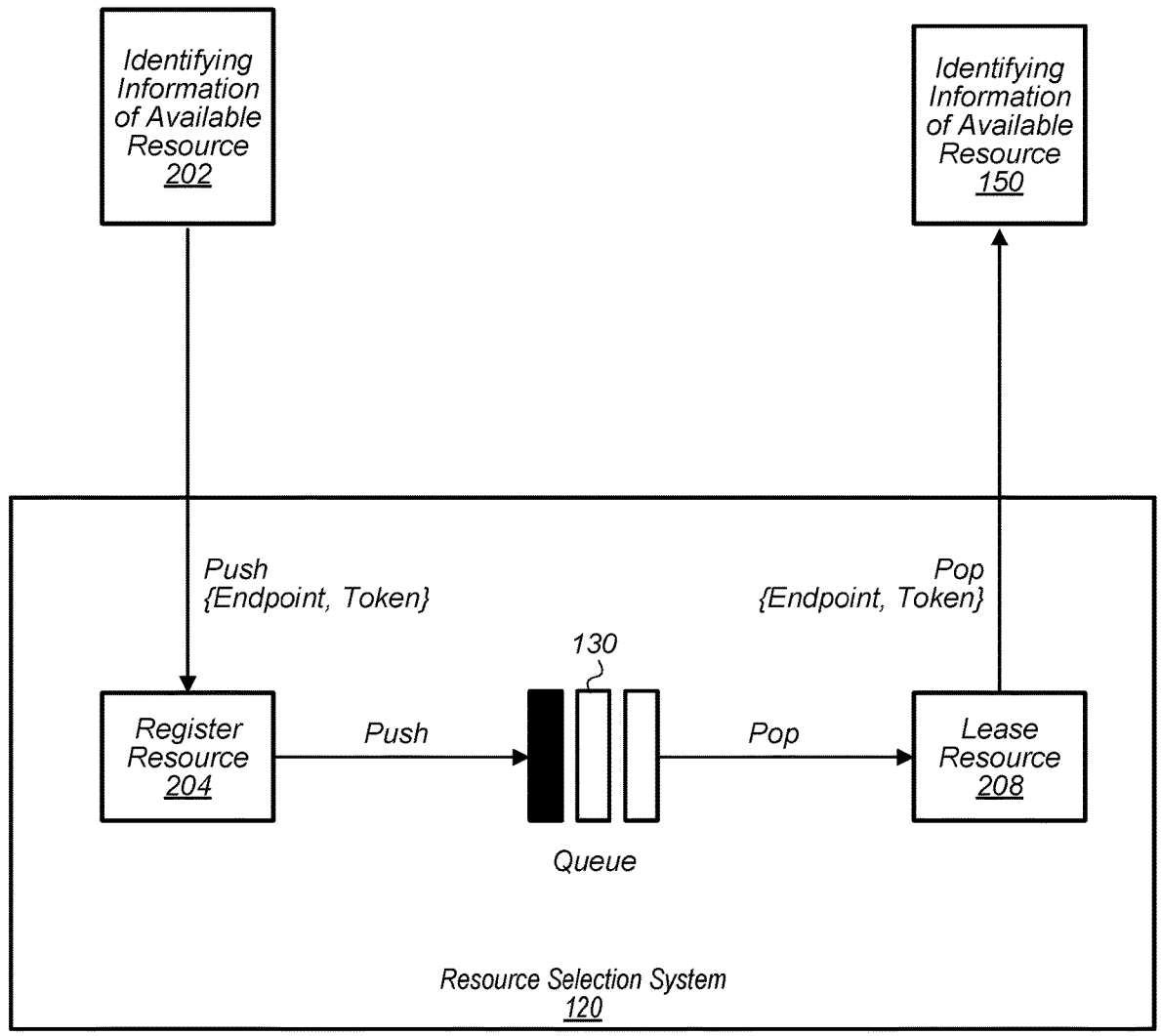
FIG. 2 illustrates an embodiment of the resource selection system that includes a queue.

FIG. 2 illustrates an embodiment of the resource selection system 120 that includes a queue 130. New resources that were just started add themselves to the queue by communicating identifying information 202 of themselves to the resource selection system 120. In one embodiment, the new resources push an endpoint which might include an IP address and a port number, and a session token, which might be encrypted by the resource, onto the queue 130 by calling a register resource 204 function.

When identifying information of an available resource is needed, an entity or function can pop identifying information 150 regarding the "next available" resource from the queue 130 by calling a lease resource 208 function. This identifying information can include an endpoint which might include an IP address and a port number, and a session token, which might be encrypted by the resource whose identifying information was popped off the queue. The entity that pops the identifying information varies depending on the different embodiments. In some embodiments, this entity is a discovery entity or function and in other embodiments the entity might be a router in a router service. In some embodiments, a health check operation can be provided by shells, so that the appropriate entity can make sure they're healthy before leasing them.

In some embodiments, if a resource dies or crashes, its shutdown hook can remove its identifying information from the queue 130 in the resource selection system 120. In some embodiments, this also happens if an idle timeout is reached. In some embodiments, the resource selection system 120 provides atomicity when leasing a resource. In these embodiments, the resource selection system 120 can lease and remove from the queue atomically.

Figure 3:
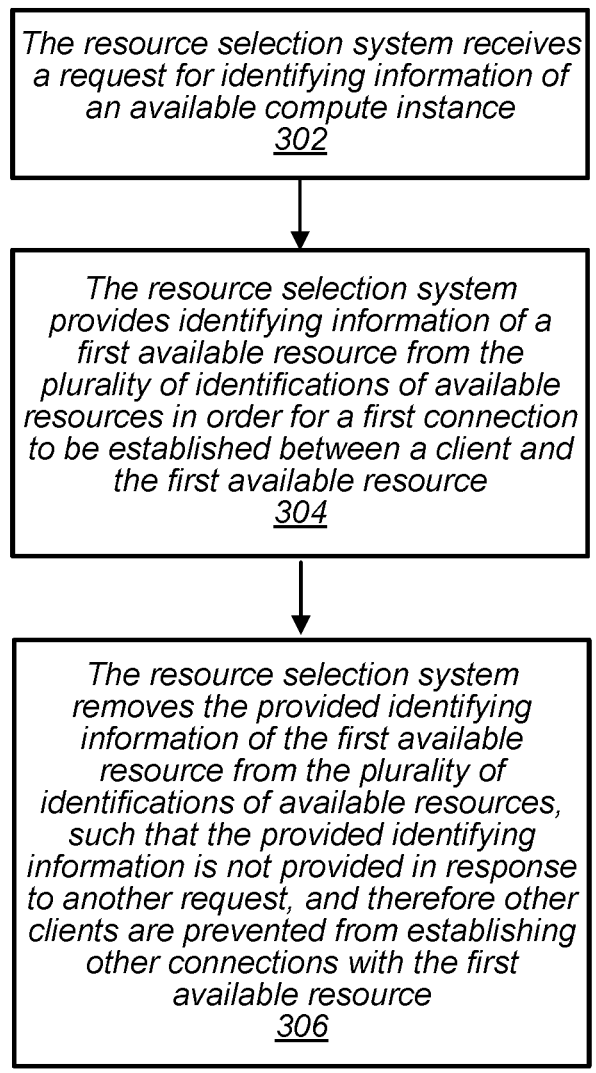
FIG. 3 illustrates is a flowchart of a resource selection system receiving a request for identifying information, according to at least some embodiments.

FIG. 3 illustrates is a flowchart of a resource selection system receiving a request for identifying information, according to at least some embodiments. The method begins in block 302 where the resource selection system receives a request for identifying information of an available compute instance. The method then transitions to block 304 where the resource selection system provides identifying information of a first available resource from the plurality of identifications of available resources in order for a first connection to be established between a client and the first available resource. The method then transitions to block 306 where the resource selection system removes the provided identifying information of the first available resource from its plurality of identifications of available resources. Therefore, in this way, the provided identifying information is not provided in response to another request, and other clients are prevented from establishing other connections with the first available resource.

Figure 4:
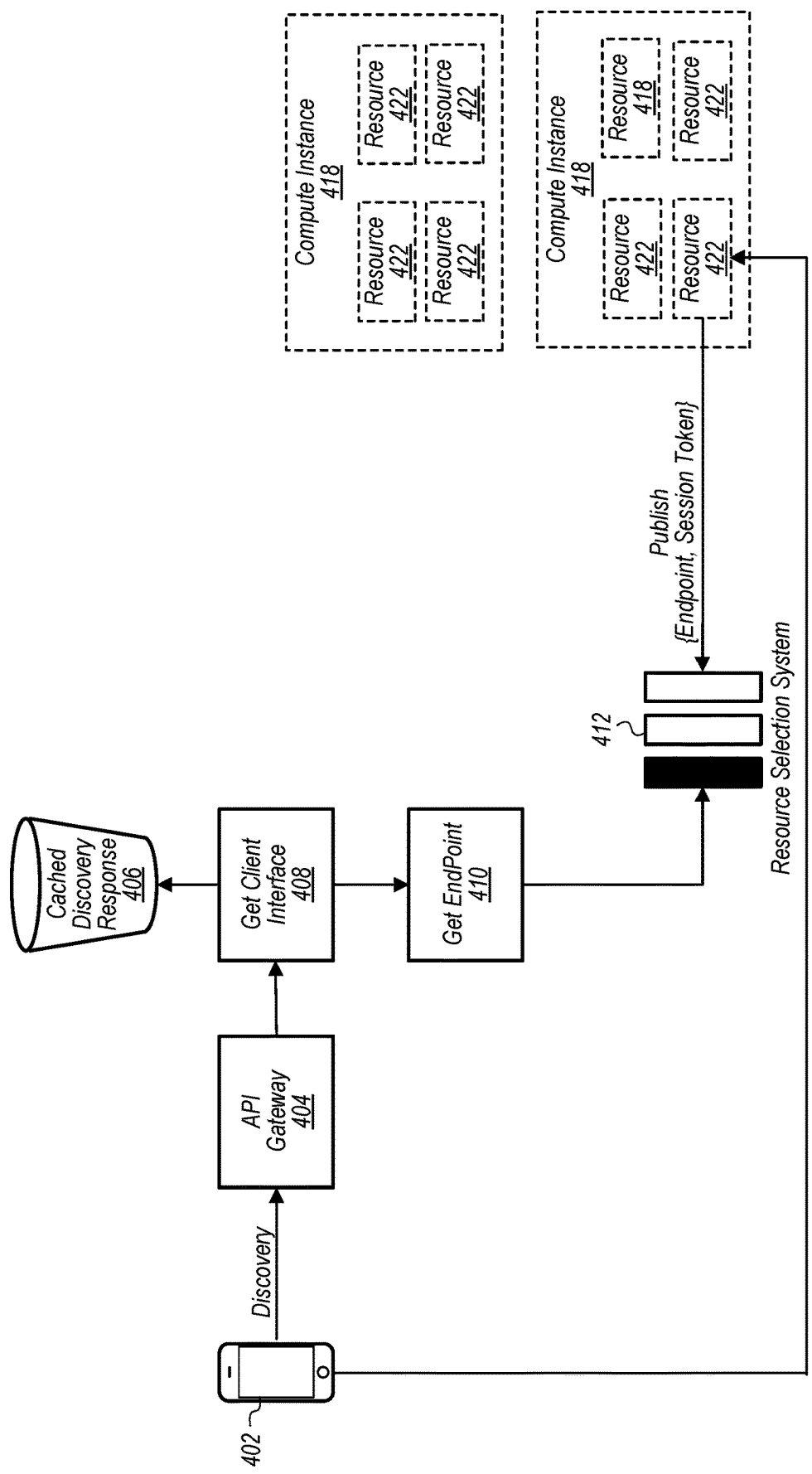
FIG. 4 is an architecture diagram that illustrates some embodiments of a resource selection system that provides for a client to directly connect to a resource.

FIG. 4 is an architecture diagram that illustrates some embodiments of a resource selection system that provides for a client to directly connect to a resource. In the embodiments represented by this figure, discovery is a function or a series of functions, fronted by API Gateway 404. The discovery process vends a fully-cachable HTML document with links to a web-standards client interface. These embodiments also include a resource selection system 412, where resources, such as a provider-network based browser, register themselves when they start up. A discovery function, such as "Get Endpoint" 410 pops identifying information of the resources from the resource selection system when the resources are allocated to a client 402. Resources 422 are run on compute instances 418, with multiple resources being able to be run on a single compute instance.

The Discovery component of FIG. 4 is the entry point in some embodiments for a client to the plurality of resources 422, according to some embodiments. In some embodiments, it has multiple responsibilities. The first responsibility of the Discovery component can be to provide a connecting client with all the information it needs to reach a resource. In some embodiments these resources include rendering instances, and a client attempts to load web content from its assigned rendering resource. A second responsibility of the Discovery component can be to terminate the initial connection, presenting an SSL certificate corresponding to the resource's endpoint requested by the client, in some embodiments. A third responsibility of the Discovery component, in some embodiments is to return a fully-cachable HTML document as response to the client.

API Gateway 404 is the entry point for all calls by the client, in some embodiments. In some of these embodiments, API Gateway can proxy a discovery request from the client to a Get Client Interface 408 function. The Get Client Interface 408 function backing discovery can return to the client, in some embodiments, a fully-cachable HTML document, containing the address of a client interface as well as some other "variables", which will be parameters on the document. In some embodiments these variables are the endpoint, the session token, and the original URL. More specifically, the endpoint is the endpoint of the resource, such as the endpoint of the provider-network based browser, that the client interface will connect to. This endpoint will be retrieved from the resource selection system 412. The session token can be an encrypted blob used for authorization. The session token can be generated by the resource on start-up, and is retrieved from the resource selection system 412 along with the endpoint. The original URL is included so that the client interface can request it to be loaded in case assisted sessions are not possible. The original URL can be extracted, in some embodiments, from the original request made by the client application.

In some embodiments, the values of these parameters can be set as cookies on the top-level domain by a different function, the Get Endpoint function 410. The Get Client Interface function 408 can call the Get Endpoints function 410, in some embodiments, inline whenever the cookies representing the endpoints are not present, for example. The client interface can also call Get Endpoints directly, whenever a new endpoint is needed (typically on a cookie expiration, for example).

The resources 422 also perform specific actions in some embodiments. During resource startup, each resource may to generate a "session token" in some embodiments. A session token is essentially an encrypted blob using a key that only the resource knows. The session token is passed down to the client interface every time a resource is "leased," in some embodiments, and it is expected to be received by the resource on every client-initiated connection. The resource then makes itself available on the resource selection system 412. In some embodiments, when a resource either crashes or reaches an idle timeout with no active connections, the resource is simply recycled in favor of a new one.

Figure 5:
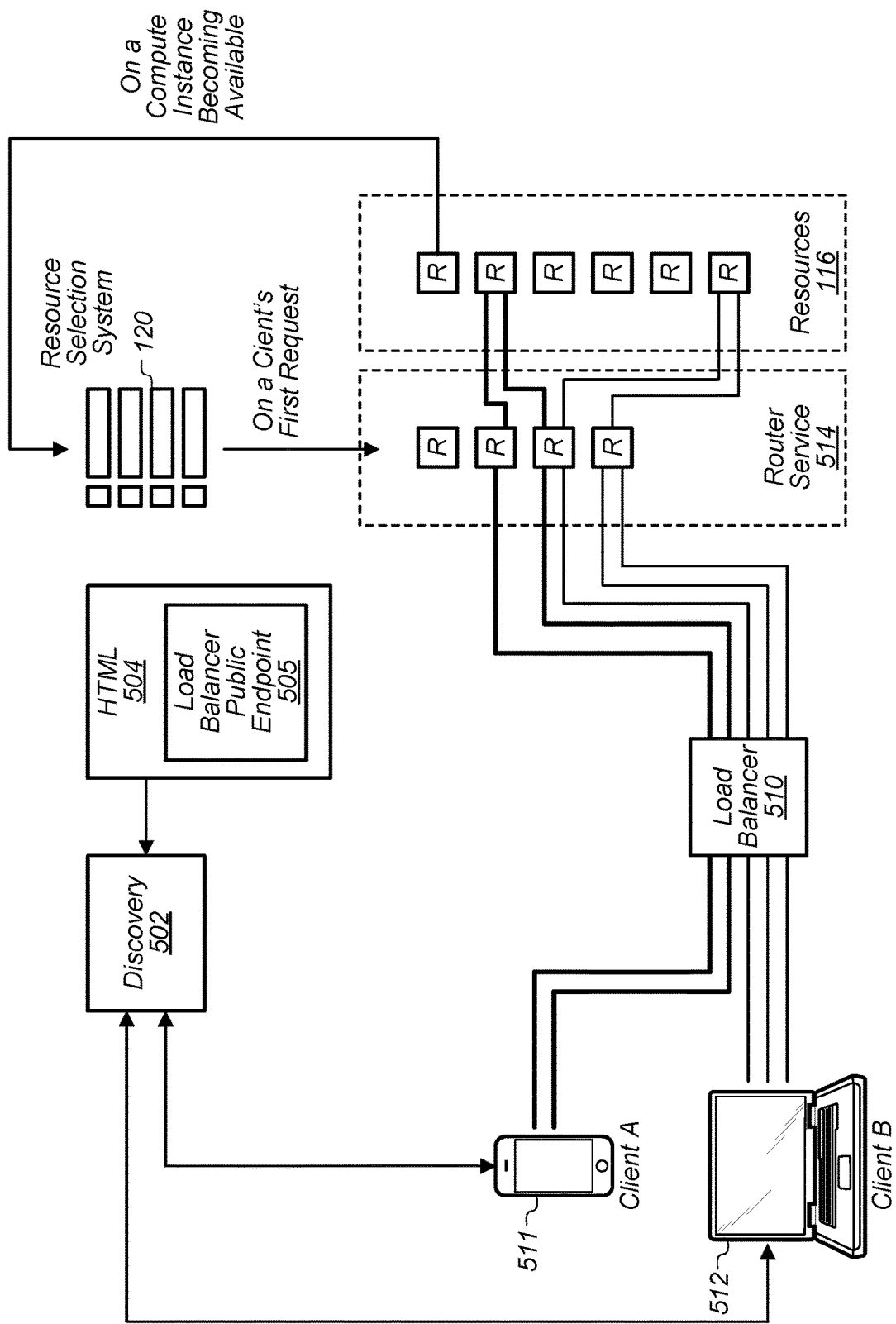
FIG. 5 is an architecture diagram that illustrates some embodiments of a resource selection system that interfaces to a router service, where the router service routes data from clients to a plurality of resource.

FIG. 5 is an architecture diagram that illustrates an example of other embodiments of a resource selection system that interfaces to a router service, which routes data from clients to a plurality of resources. In these embodiments, a Discovery component 502 vends an HTML document 504 that includes a Load Balancer endpoint 505, instead of a direct-connect endpoint to the resource. In other embodiments, the Discovery component might vend another type of document or information. In other embodiments, the Discovery component might vend information that includes an address of another component for the client to communicate with, such as a DNS server for example. In some of these embodiments that include a DNS server, the DNS server can provide network addresses, such as IP addresses, of the routers to the clients upon request, using some algorithm to distribute the client requests across the fleet of load balancers. For example, a DNS server can use a round-robin algorithm to return an IP address of the next router to the client that makes the next request. The DNS server might use other algorithms to return IP addresses of the routers to the clients, such as randomly providing an IP address of a router to a client upon request.

In some of the embodiments with a load balancer, the load balancer 510 fronts calls from the client interface to the router service 514. The session token, when decrypted, contains the internal endpoint of the resource. A router in the router service 514 decrypts the session token and thereby knows which resource to route the connection to.

In some embodiments, the main goal of the router service is to connect a client-side entity, such as 511 or 512, with an available resource in the plurality of resources 116. If that client already has a resource allocated, the same one should be returned, in some embodiments. For example, in embodiments where the resource is a provider-network based browser, when a new tab is opened, or when the client is re-connecting due to a dropped connection, then the same resource may be returned by the router service. This allows a client to "resume" a browsing session, in these embodiments.

In some embodiments that include a load balancer, the load balancer public endpoint 505 is the endpoint that may be returned to connecting clients by the Discovery component 502. When a client interface tries to establish a web sockets connection to the backend, for example, the load balancer will just delegate the connection to the router service 514. In some of these embodiments, the load balancers will use a load balancing algorithm to delegate the connection to the router service 514. In other embodiments that do not include a traditional load balancer, the client will directly communicate with a router. In some of these embodiments, the client receives the network address of one of the routers in the pool of routers from a DNS server. In other embodiments, when the same client requires a new connection to a resource, the client might use the received identifying information to establish a direct connection to the resource that is identified in the identifying information. In other embodiments, the client might use the identifying information in order to communicate with the resource, such as a provider-network based browser, by means other than a direct connection to the resource, such as an indirect connection.

In some of the embodiments that include a router service, the router service 514 implements stickiness to resources via a cookie called session token. In some of these embodiments, this cookie is merely an encrypted blob, that only the routers know how to decrypt, and when decrypted contains the public endpoint of a resource. If a request received by the router service 514 does not contain this cookie, it is assumed to be the first request made by that client (511 or 512), and therefore a new resource is assigned, in some embodiments. In some of these embodiments, the cookie is set at the top-level domain, meaning that requests for reconnections and new tabs (in the embodiments where the resources are client-based browsers) will contain the cookie.

In some embodiments, the client might encrypt some or all of the communication, whether the communication be to a load balancer, or a router, or a resource. The client might encrypt some of all of the communication even if the identifying information has already been encrypted by a router, for example. In other embodiments, the client might digitally sign some or all of the communication, whether the communication be to a load balancer, or a router, or a resource. The client might use some other type of protection or identification system or method in order to provide security for the communication, so that the communication is at least tamper detectable by the receiving party.

Flow Diagrams for Various Embodiments of Load Balancing Requests such that Target Resources Serve a Single Client FIGS. 7-10 are flow diagrams that illustrate various scenarios according to at least some embodiments, including at least some of the embodiments represented by the architecture of FIG. 4. While these embodiments depict the resource as a provider-network based browser, this is not intended to be limiting. In fact, these flow diagrams can apply to any types of resources, including but not limited to provider-network based browsers.

Figure 7:
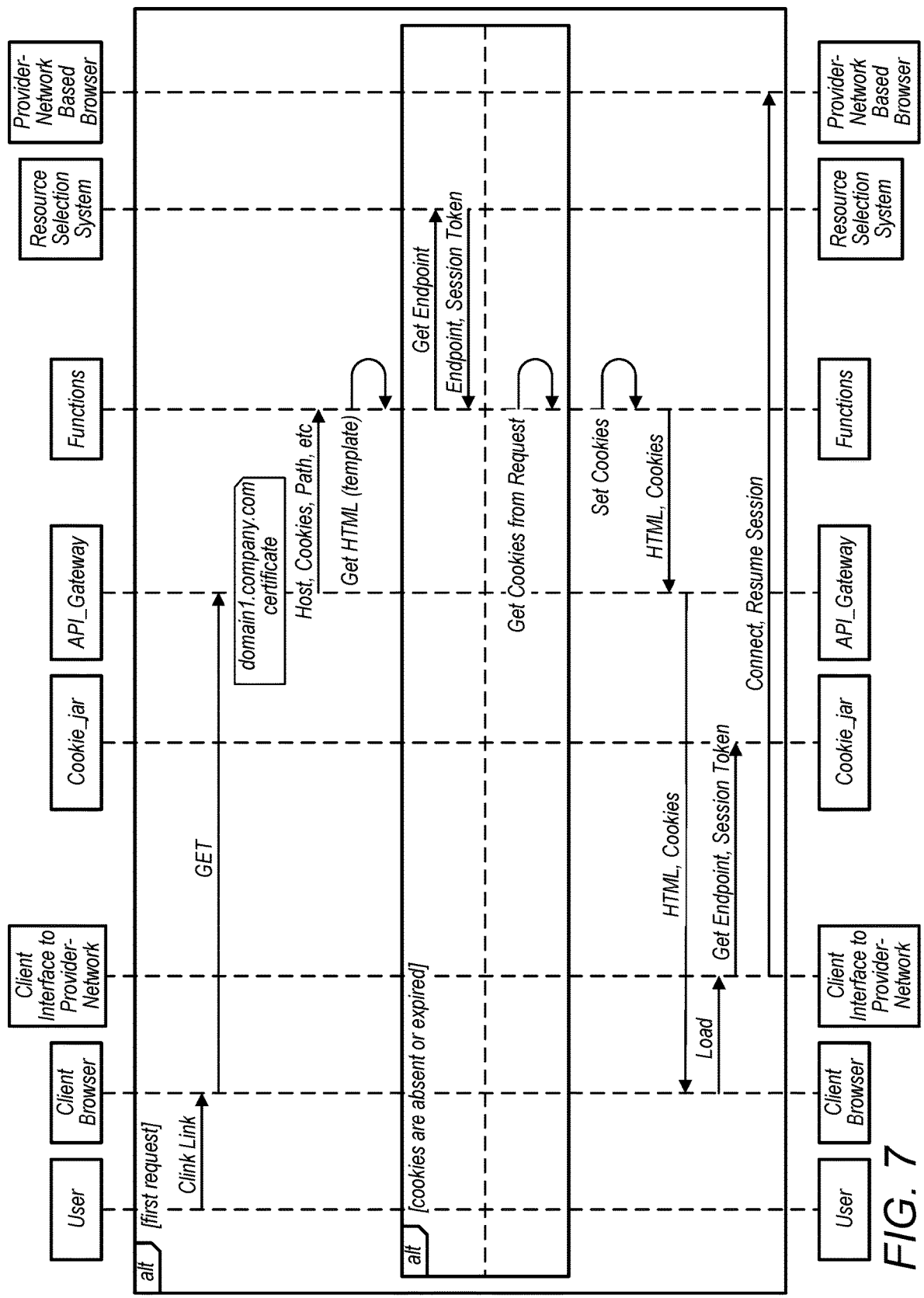
FIG. 7 illustrates a flow diagram of client connecting to a resource, such as a provider-network based browser instance, for the first time, according to at least some embodiments.
Figure 8:
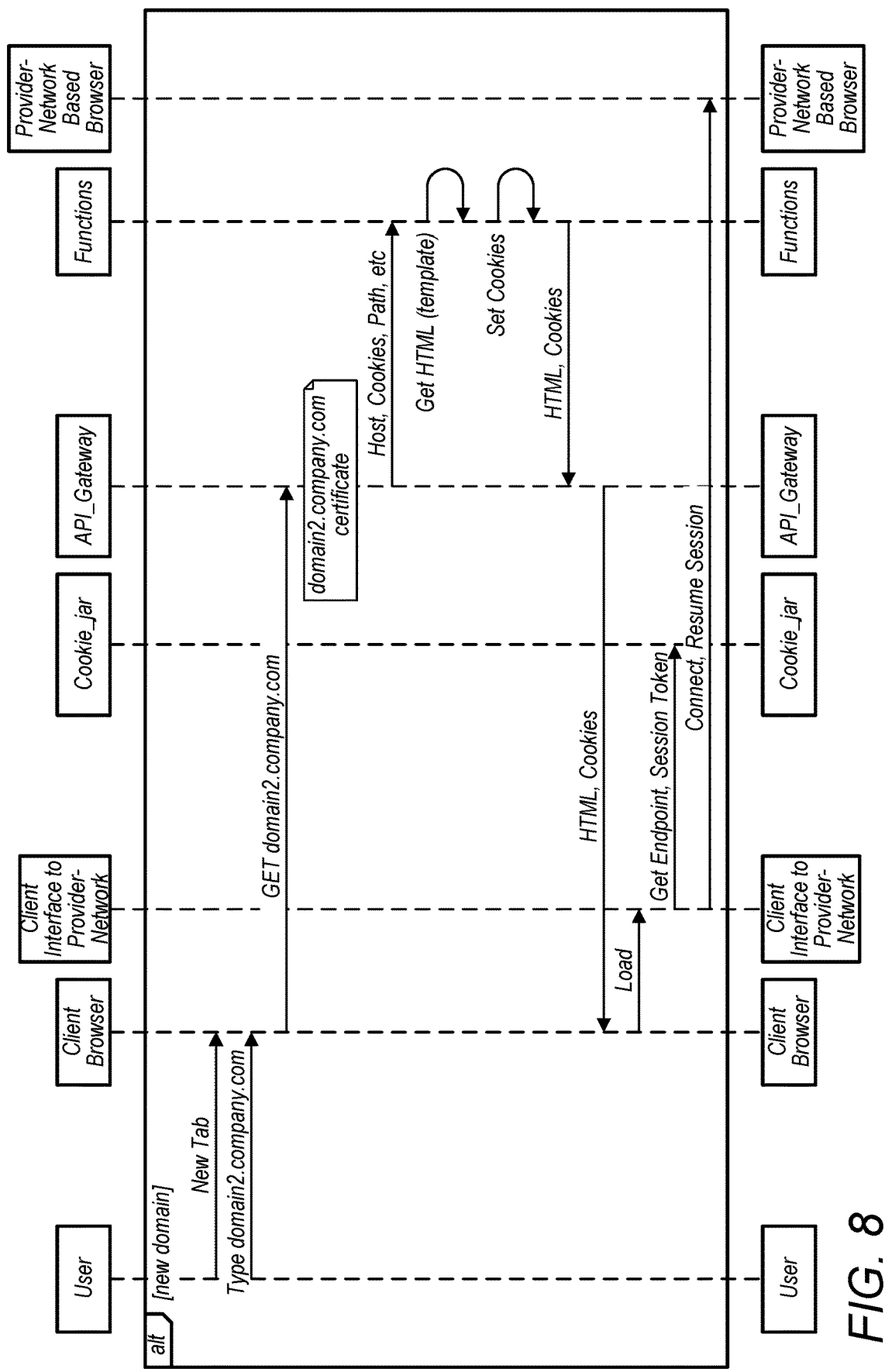
FIG. 8 illustrates a flow diagram of a client that is already connected to a provider-network based browser instance, and which establishes a new connection or resumes a session to the same provider-network based browser instance, according to at least some embodiments.
Figure 9:
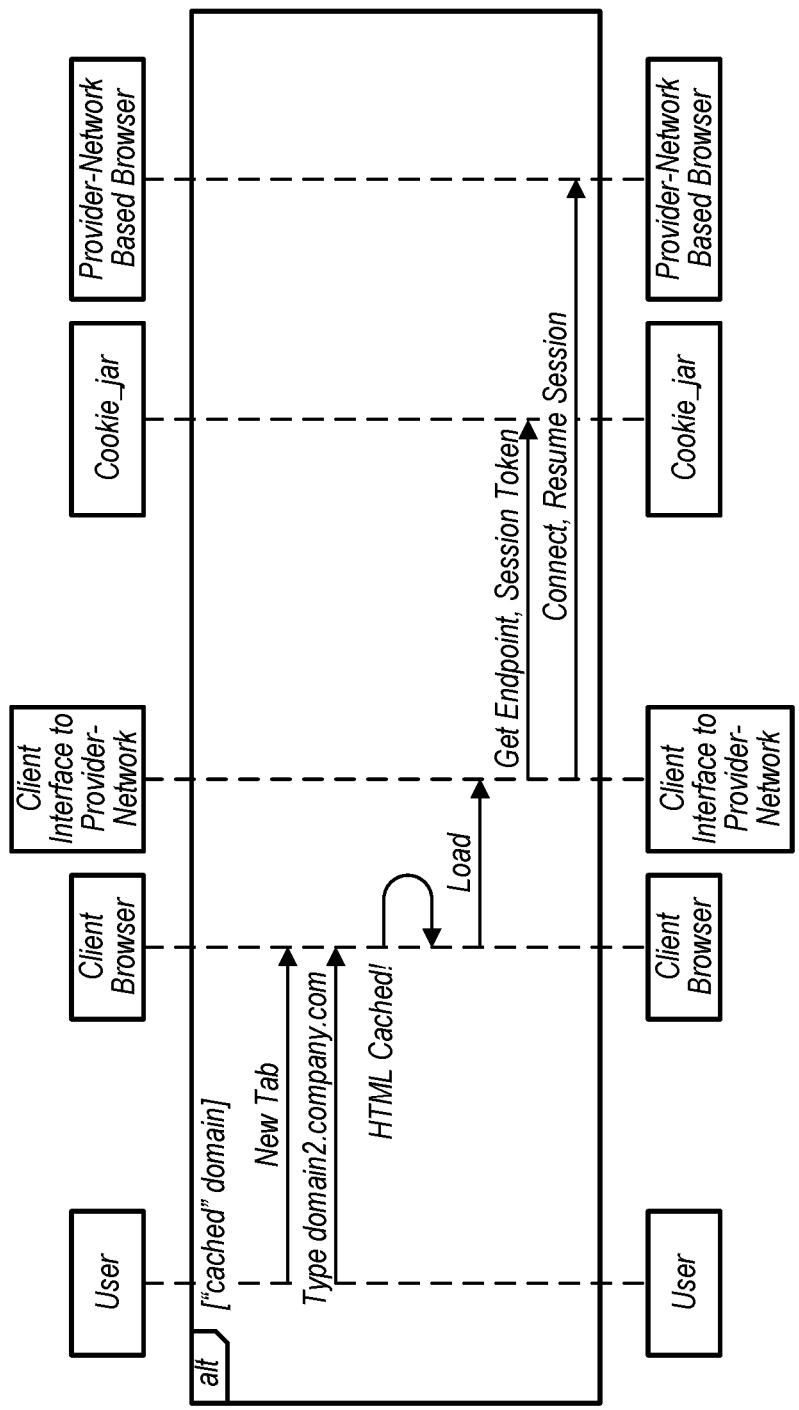
FIG. 9 illustrates a flow diagram of a client that opens a new tab in a client browser and navigates to a previously visited URL, according to at least some embodiments.
Figure 10:
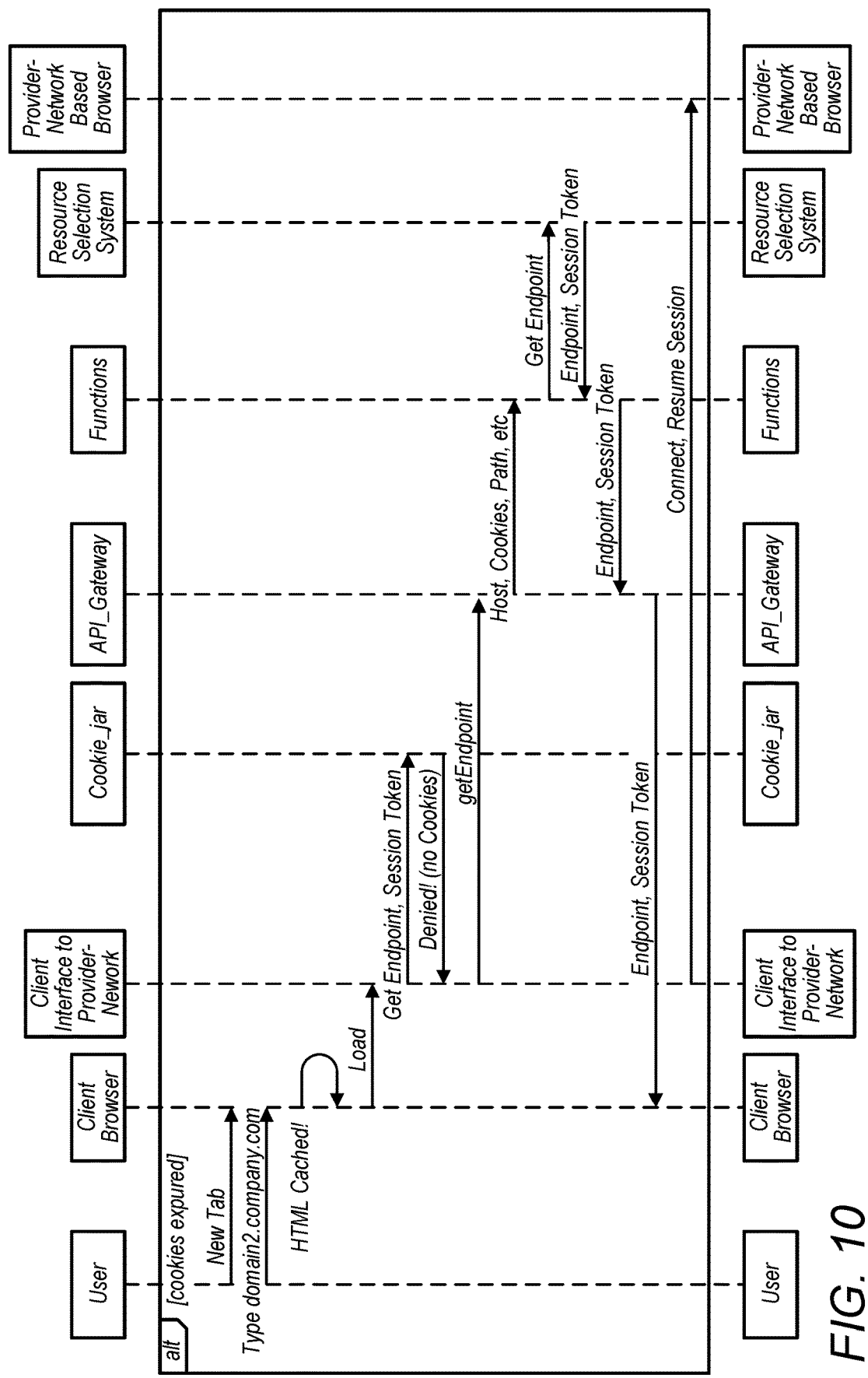
FIG. 10 illustrates a flow diagram that occurs when cookies are absent or expired, according to at least some embodiments.

FIG. 7 illustrates a flow diagram of client connecting to a provider-network based browser instance for the first time, according to at least some embodiments. In FIG. 7, an HTML document is supplied by the API Gateway to the client. The HTML document itself won't change between requests and is therefore cachable by the client. FIG. 8 illustrates a flow diagram of a client that is already connected to a resource, but where the client establishes a new connection or resumes a session to the same resource, according to at least some embodiments. If the client is already connected to a provider-network based browser, then the Get Endpoints function 410 will receive the current endpoint as a cookie, and can return the same value to the client, so scenarios like multiple tabs are connected to and loaded by the same provider-network based browser instance. FIG. 9 illustrates a timing diagram of client that opens a new tab in a client browser and navigates to a previously visited URL, according to at least some embodiments. If the client opens a new tab and navigates to a previously visited URL, the HTML document will be cached and the cookies will be present, meaning that the client interface will be loaded and will directly connect to the existing provider-network based browser instance. FIG. 10 illustrates a timing diagram that occurs when cookies are absent or expired, according to at least some embodiments. If the cookies are absent/expired and the HTML document is cached, the client interface will call the Get Endpoints function 410 directly and will retrieve a new provider-network based browser endpoint and session token, and will connect directly to the provider-network based browser.

Figure 6:
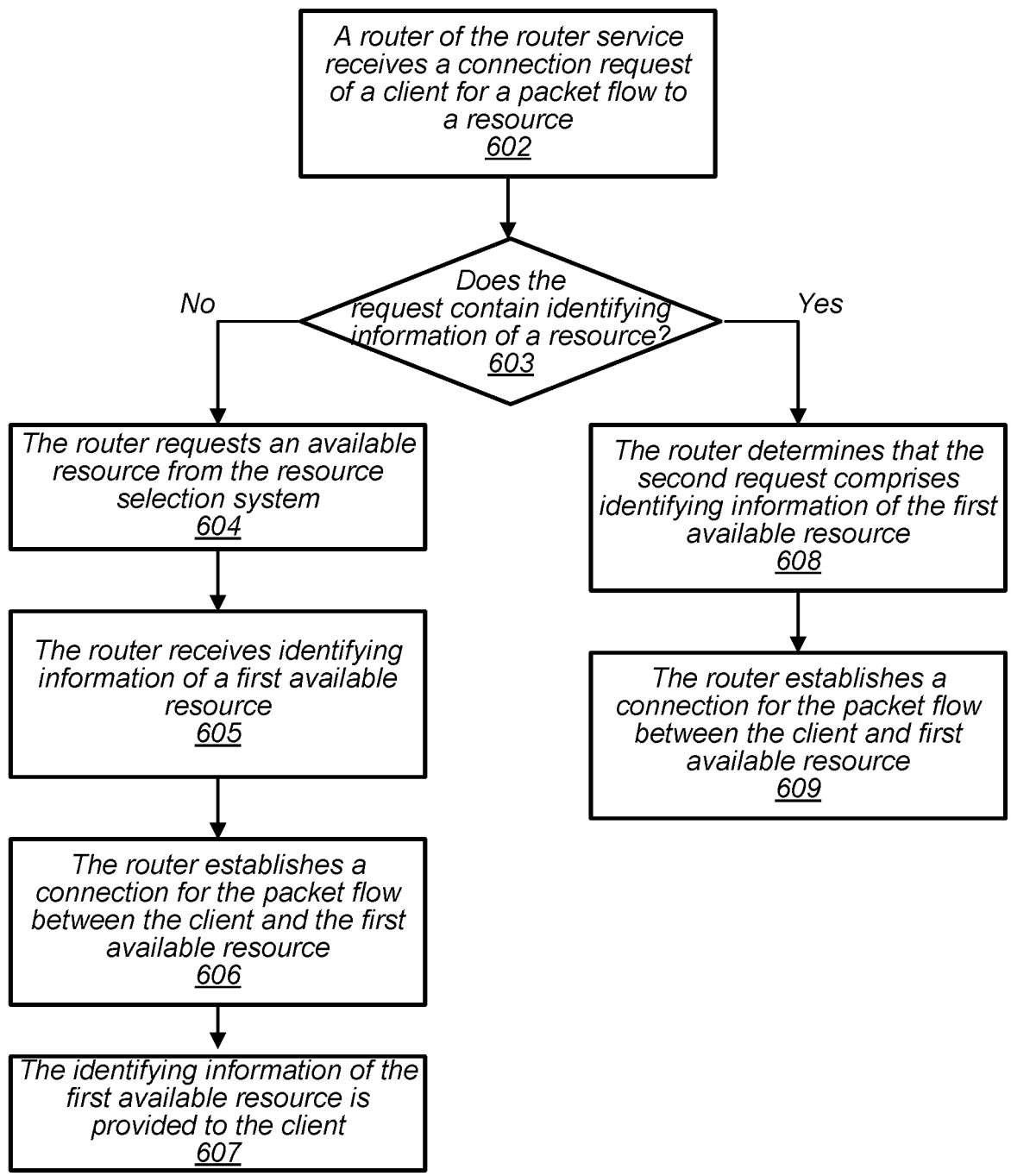
FIG. 6 illustrates is a flowchart of a router service that receives a request of a client for a packet flow to a resource, according to at least some embodiments.

FIG. 6 illustrates is a flowchart of a router service that receives a request of a client for a packet flow to a resource, according to at least some embodiments, including at least some of the embodiments represented by the architecture of FIG. 5.

The flowchart begins in block 602 where a router of the router service receives a connection request of a client for a packet flow to a resource. The flow transitions to block 603 which determines whether the request contains identifying information of a resource. If the request does not include any identifying information of a resource, then the flow transitions to block 604, in which the router requests an available resource from the resource selection system. The flow transitions to block 605 in which the router receives identifying information of a first available resource, from the resource selection system in some embodiments. The flow then transitions to block 606 in which the router establishes a connection for the packet flow between the client and the first available resource. The flow then transitions to block 607 in which the identifying information of the first available resource is provided to the client. In some embodiments, the router might receive incoming packets for the connection and send the packets to the resource.

If, in block 603, the connection request of a client for a packet flow to a resource does include identifying information of a resource, then the flow transitions to block 608, in which the router determines that the second request comprises identifying information of the first available resource. Then the flow transitions to block 609 in which the router establishes a connection for the packet flow between the client and first available resource. In some embodiments, the router might receive incoming packets for the connection and send the packets to the resource.

Load Balancing Requests such that Target Resources Serve a Single Client in a Provider Network This section describes example provider network environments in which embodiments of load balancing requests such that target resources serve a single client methods and apparatuses may be implemented. However, these example provider network environments are not intended to be limiting.

Figure 11:
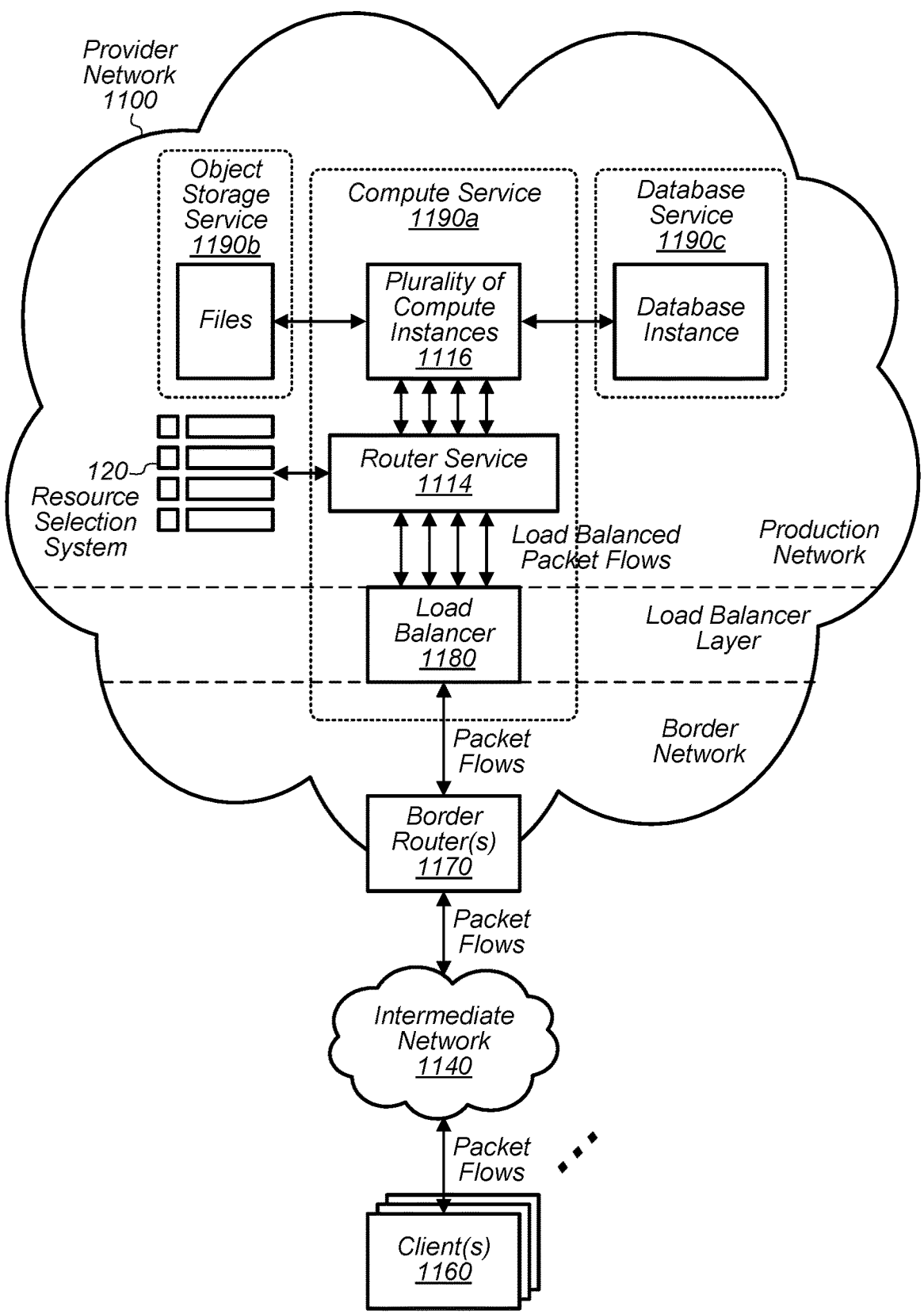
FIG. 11 illustrates a resource selection system, along with a load balancer and a router service in an example provider network environment, according to at least some embodiments.

FIG. 11 illustrates a resource selection system, along with a load balancer and a router service in an example provider network environment, according to at least some embodiments. A provider network 1100 may provide resource virtualization to clients via one or more virtualization services that allow clients to access, purchase, rent, or otherwise obtain instances of virtualized resources, including but not limited to computation and storage resources, implemented on devices within the provider network or networks in one or more data centers. In some embodiments, private IP addresses may be associated with the resource instances; the private IP addresses are the internal network addresses of the resource instances on the provider network 1100. In some embodiments, the provider network 1100 may also provide public IP addresses and/or public IP address ranges (e.g., Internet Protocol version 4 (IPv4) or Internet Protocol version 6 (IPv6) addresses) that clients may obtain from the provider 1100.

Conventionally, the provider network 1100, via the virtualization services, may allow a client of the service provider (e.g., a client that operates clients 1160) to dynamically associate at least some public IP addresses assigned or allocated to the client with particular resource instances assigned to the client. The provider network 1100 may also allow the client to remap a public IP address, previously mapped to one virtualized computing resource instance allocated to the client, to another virtualized computing resource instance that is also allocated to the client. Using the virtualized computing resource instances and public IP addresses provided by the service provider, a client of the service provider such as the operator of clients 1160 may, for example, implement client-specific applications and present the client's applications on an intermediate network 1140, such as the Internet. Either the clients 1160 or other network entities on the intermediate network 1140 may then generate traffic to a destination domain name published by the clients 1160.

First, in some embodiments, either the clients 1160 or the other network entities make a request to the load balancer 1180 for a connection to a compute instance in the plurality of compute instances 1116. In other embodiments, load balancing is performed by another component, such as a DNS server for example. In other embodiments, no load balancing is performed, with a client communicating directly with the router pool or a router in the router pool. In some of the embodiments that include a DNS server, the DNS server can provide network addresses, such as IP addresses, of the routers to the clients upon request, using some algorithm to distribute the client requests across the fleet of load balancers. For example, a DNS server can use a round-robin algorithm to return an IP address of the next router to the client that makes the next request. The DNS server might use other algorithms to return IP addresses of the routers to the clients, such as randomly providing an IP address of a router to a client upon request.

In some of the embodiments that include a load balancer, the load balancer 1180 uses a load balancing algorithm to communicate the request to a router in the router service 1114. In other embodiments that do not include a traditional load balancer, the client will directly communicate with a router. In some of these embodiments, the client receives the network address of one of the routers in the pool of routers from a DNS server. In other embodiments, when the same client requires a new connection to a resource, the client might use the received identifying information to establish a direct connection to the resource that is identified in the indentifying information. In other embodiments, the client might use the identifying information in order to communicate with a resource, such as a provider-network based browser, using means other than a direct connection to the resource, such as an indirect connection to the resource.

If the request does not include any identifying information of a compute instance of the plurality of compute instances 1116, then the router service 1114 requests identifying information of an available compute instance from the resource selection system 120. The resource selection system 120 responds to the router service 1114 with identifying information regarding an available compute instance.

The router service 1114 responds with the identifying information which might include a public IP address of the server instance of a plurality of server instances in the compute service 1190a of the provider network 1100. Then the clients 1160 or other network entities on the intermediate network 1140 may then generate traffic to public IP address that was received by the router service. The traffic is routed to the service provider data center, and at the data center is routed, via a network substrate, to the private IP address of the virtualized computing resource instance currently mapped to the destination public IP address. Similarly, response traffic from the virtualized computing resource instance may be routed via the network substrate back onto the intermediate network 1140 to the source entity.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance. Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 1100; a client may then assign their allocated public IP addresses to particular resource instances allocated to the client. These public IP addresses may be referred to as client public IP addresses, or simply client IP addresses. Instead of being assigned by the provider network 1100 to resource instances as in the case of standard IP addresses, client IP addresses may be assigned to resource instances by the clients, for example via an API provided by the service provider. Unlike standard IP addresses, client IP addresses are allocated to client accounts and can be remapped to other resource instances by the respective clients as necessary or desired. A client IP address is associated with a client's account, not a particular resource instance, and the client controls that IP address until the client chooses to release it. A client IP address can be an Elastic IP address. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

A provider network 1100 may provide a compute service 1190a implemented by physical server nodes to clients 1160, which includes a plurality of compute instances 1116. The compute service also contains many other server instances for many other clients and other customers of the provider network 1100. As another example, the provider network provides a virtualized data storage service or object storage service 1190b which can include a plurality of data storage instances implemented by physical data storage nodes. The data storage service or object storage service 1190b can store files for the client, which are accessed by the appropriate server instance of the client. As another example, the provider network might provide a virtualized database service 1190c implemented by database nodes, which includes at least one database instance for a client. A server instance pertaining to the client in the compute service can access a database instance pertaining to the client when needed. The database service and data storage service also contain multiple files or database instances that pertain to other clients and other customers of the provider network 1100. The provider network can also include multiple other client services that pertain to one or more customers. The clients 1160 may access any one of the client services 1190a, 1190b, or 1190c, for example, via an interface, such as one or more APIs to the service, to obtain usage of resources (e.g., data storage instances, or files, or database instances, or server instances) implemented on multiple nodes for the service in a production network portion of the provider network 1100.

Communication from the clients to an instance of a service can be routed to the appropriate instance by a border router 1170, a load balancer 1180, and/or a series of routers 1114. Server nodes in the compute service 1190a may each implement a server, for example a web server or application server or a provider-network based browser. One or more load balancers 1180 may be implemented in a load balancer layer between the border network and the production network. Border router(s) 1170 may receive packets (e.g., TCP packets) in packet flows from clients 1160 via an intermediate network 1140 such as the Internet, and forward the packets to the appropriate server node or instance, or it might forward the packets containing a public IP address to an apparatus that can map the public IP address to a private IP address. The packets may be targeted at the public IP address(es) included in responses to requests. The load balancers 1180 may use the procedures described herein to determine target server nodes or compute instances in the plurality of compute instances 1116, as one example of a plurality of resources, for the packet flows, and to facilitate traffic between the compute instances and the clients 1160.

Illustrative System

Figure 12:
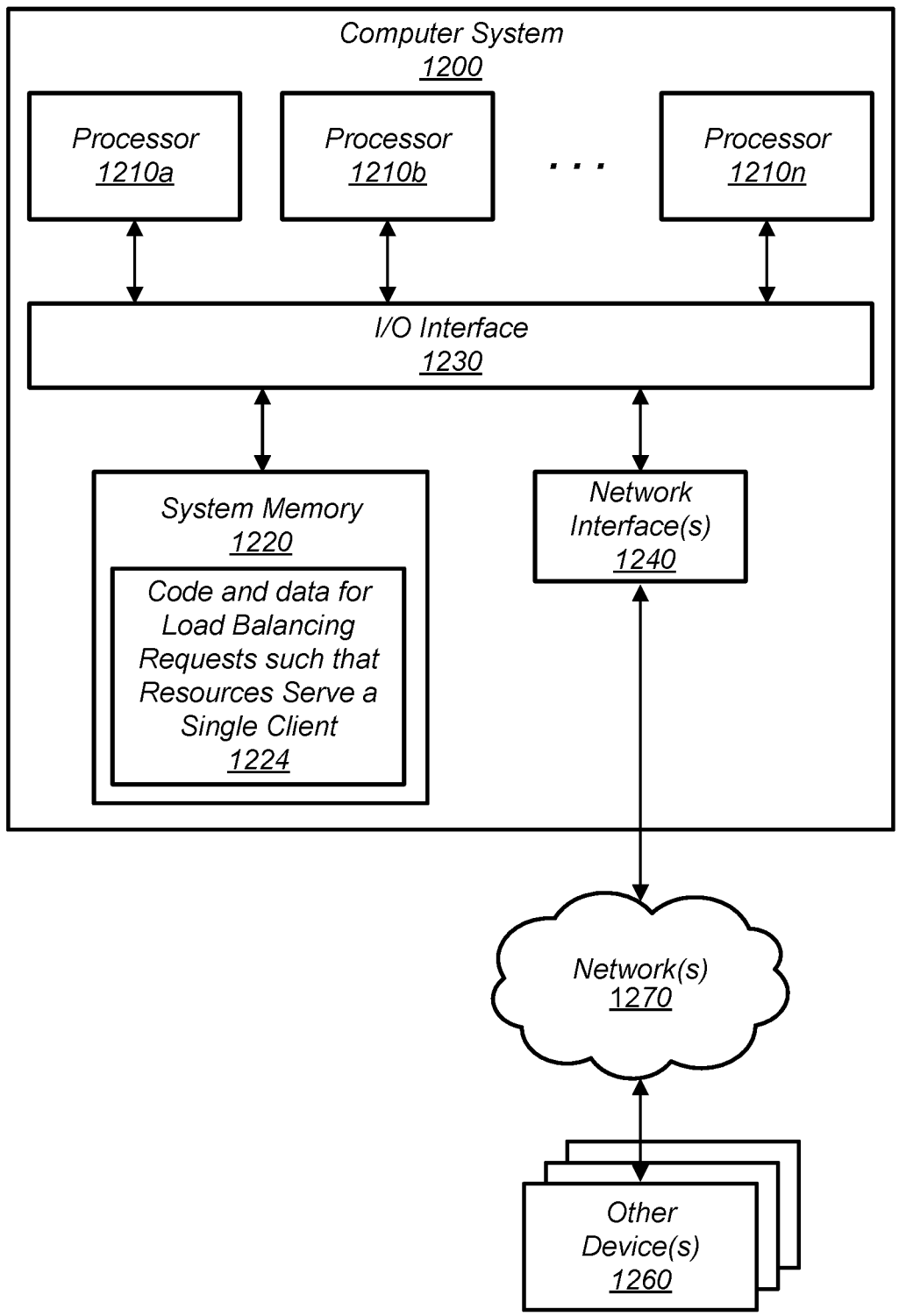
FIG. 12 is a block diagram illustrating an example computer system that may be used in some embodiments.

In at least some embodiments, a computer that implements a portion or all of the methods and apparatus for load balancing requests such that target resources serve a single client as described herein may include a general-purpose computer system or computing device that includes or is configured to access one or more computer-accessible media, such as computer system 1200 illustrated in FIG. 12. FIG. 12 is a block diagram illustrating an example computer system that may be used in some embodiments. This computer system can be used as a resource selection system 120, for example, or as a resource host which executes one or more of the resource instances (such as 116) or one or more of the plurality of compute instances 1116 in the compute service 1190a. In the illustrated embodiment, computer system 1200 includes one or more processors 1210 coupled to a system memory 1220 via an input/output (I/O) interface 1230. Computer system 1200 further includes a network interface 1240 coupled to I/O interface 1230.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store instructions and data accessible by processor(s) 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for load balancing requests such that resources serve a single client, are shown stored within system memory 1220 as the code and data for a DNS-based load balanced system with dynamic DNS record TTLs 1224.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1270, such as other computer systems or devices as illustrated in FIGS. 1, 2, 4, and 5, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above for FIGS. 1 through 11 for implementing load balancing requests such that resources serve a single client. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. A system, comprising:
   a plurality of computers and associated memory configured to implement a plurality of resources for a network-based service, wherein the network-based service is established for a plurality of clients; and
   a resource selection system comprising a plurality of identifications of available resources of the plurality of resources;
   wherein the resource selection system is configured to:
      receive a request for identifying information of an available resource;
      provide identifying information of a first available resource from the plurality of identifications of available resources in order for a first connection to be established between a client of the plurality of clients and the first available resource; and
      remove the provided identifying information of the first available resource from the plurality of identifications of available resources to prevent other clients of the plurality of clients from establishing other connections with the first available resource;
   wherein requests from the client for additional connections to a resource result in the establishment of one or more additional connections between the client and the first available resource, such that multiple concurrent connections for the client are established with the same first available resource while no connections between any of the other clients and the first available resource are established; and
   wherein requests from all of the other clients of the plurality of clients for a connection to a resource result in the establishment of connections between the other clients and other resources of the plurality of resources while the requests from the client result in the establishment of the one or more additional connections between the client and the first available resource.

2. The system of claim 1 further comprising: a router service comprising one or more routers configured to:
   receive a first request of the client of the plurality of clients for a first packet flow to a resource;
   determine that the first request does not include identifying information of a resource;
   request identifying information of an available resource from the resource selection system;

receive the identifying information of the first available resource from the resource selection system;
establish the first connection for the first packet flow between the client and the first available resource; and
provide the identifying information of the first available resource to the client.

3. The system of claim 2 wherein the router service is further configured to:
receive a second request of the client for a second packet flow to a resource;
determine that the second request comprises identifying information of the first available resource; and
establish a second connection for the second packet flow between the client and the first available resource.

4. The system of claim 3 further comprising:
one or more computers and associated memory configured as one or more load balancer nodes;
wherein the one or more load balancer nodes are configured to distribute packet flows from a client to the router service, wherein, to distribute the packet flows to the router service, the one or more load balancer nodes are configured to:
select a router from among the one or more routers of the router service to receive either the first or second request from the client; and
send the request to the selected router;
wherein the selected router of the router service is configured to:
receive the request of the client for either the first or second packet flow from one of the one or more load balancer nodes.

5. The system of claim 2 further comprising:
wherein the resource selection system comprises a queue, wherein identifying information of a resource is pushed onto the queue when the resource selection system receives a notification that the resource is available, and wherein the identifying information of the first available resource is popped off the queue in order for the resource selection system to provide the identifying information of the first available resource in response to the request for identifying information of an available resource.

6. The system of claim 1 further comprising:
wherein, after the first connection for the first packet flow between the client and the first available resource is established, the first available resource is configured to:
reject connection requests from other clients.

7. A method, comprising:
receiving a request for identifying information of an available resource;
providing identifying information of a first available resource of a plurality of resources from a plurality of identifications of available resources in order for a first connection to be established between a client of a plurality of clients and the first available resource; and
removing the provided identifying information of the first available resource from the plurality of identifications of available resources to prevent other clients of the plurality of clients from establishing other connections with the first available resource;
wherein requests from the client for additional connections to a resource result in the establishment of one or more additional connections between the client and the first available resource, such that multiple concurrent connections for the client are established with the same first available resource while no connections between any of the other clients and the first available resource are established; and
wherein requests from all of the other clients of the plurality of clients for a connection to a resource result in the establishment of connections between the other clients and other resources of the plurality of resources while the requests from the client result in the establishment of the one or more additional connections between the client and the first available resource.

8. The method of claim 7 further comprising:
receiving a first request of the client of the plurality of clients for a first packet flow to a resource;
determining that the first request does not include identifying information of a resource;
requesting identifying information of an available resource;
receiving the identifying information of the first available resource;
establishing the first connection for the first packet flow between the client and the first available resource; and
providing the identifying information of the first available resource to the client.

9. The method of claim 8 further comprising:
receiving a second request of the client for a second packet flow to a resource;
determining that the second request comprises identifying information of the first available resource; and
establishing a second connection for the second packet flow between the client and the first available resource.

10. The method of claim 9:
wherein the receiving a first request of a client for a first packet flow and the receiving a second request of a client for a second packet flow further comprises receiving the requests from one or more load balancer nodes, wherein the one or more load balancer nodes are configured to distribute packet flows from a client.

11. The method of claim 9:
wherein the second request of the client for the second packet flow to the resource either comprises encrypted identifying information of the first available resource or is digitally signed, and wherein the method further comprises:
decrypting either the encrypted identifying information of the first available resource or the digital signature.

12. The method of claim 9:
wherein the receiving the first request of the client for a first packet flow to a resource, and the receiving the second request of the client for a second packet flow to a resource is performed by a router service comprising one or more routers, wherein a different router can perform the steps associated with the second request of the client for the second packet flow than the router that performs the steps associated with the first request of the client for the first packet flow.

13. The method of claim 8:
wherein the receiving a request for identifying information of an available resource is performed by a resource selection system, wherein the resource selection system comprises a queue, wherein identifying information of a resource is pushed onto the queue when the resource selection system receives a notification that the resource is available, and wherein the identifying information of the first available resource is popped off the queue in order for the resource selection system to provide the identifying information of the first available resource in response to the request for identifying information of an available resource.

14. The method of claim 7:

wherein, after the first connection for the first packet flow between the client and the first available resource is established, the first available resource is configured to: reject connection requests from other clients.

15. The method of claim 7:

wherein the receiving a request for identifying information of an available resource is performed by a resource selection system, and wherein the resource selection system provides the identifying information of a first available resource, and removes the provided identifying information of the first available resource from the plurality of identifications of available resources, atomically.

16. A non-transitory computer-readable storage medium storing program instructions that when executed by one or more processors cause the one or more processors to:

receive a request for identifying information of an available resource;

provide identifying information of a first available resource of a plurality of resources from a plurality of identifications of available resources in order for a first connection to be established between a client of a plurality of clients and the first available resource; and remove the provided identifying information of the first available resource from the plurality of identifications of available resources to prevent other clients of the plurality of clients from establishing other connections with the first available resource;

wherein requests from the client for additional connections to a resource result in the establishment of one or more additional connections between the client and the first available resource, such that multiple concurrent connections for the client are established with the same first available resource while no connections between any of the other clients and the first available resource are established; and wherein requests from all of the other clients of the plurality of clients for a connection to a resource result in the establishment of connections between the other clients and other resources of the plurality of resources while the requests from the client result in the establishment of the one or more additional connections between the client and the first available resource.

17. The non-transitory computer-readable storage medium of claim 16, storing program instructions that when executed by one or more processors further cause the one or more processors to:

receive a first request of the client of the plurality of clients for a first packet flow to a resource;

determine that the first request does not include identifying information of a resource;

request identifying information of an available resource;

receive the identifying information of the first available resource;

establish the first connection for the first packet flow between the client and the first available resource; and provide the identifying information of the first available resource to the client.

18. The non-transitory computer-readable storage medium of claim 17, storing program instructions that when executed by one or more processors further cause the one or more processors to:

establish, using the identifying information of the first available resource, a second connection for a second packet flow between the client and the first available resource.

19. The non-transitory computer-readable storage medium of claim 17:

wherein to receive a first request of the client for a first packet flow to a resource further comprises to receive the requests from one or more load balancer nodes, wherein the one or more load balancer nodes are configured to distribute packet flows from a client.

20. The non-transitory computer-readable storage medium of claim 17, wherein the receiving a request for identifying information of an available resource is performed by a resource selection system, wherein the resource selection system comprises a queue, and wherein the non-transitory computer-readable storage medium stores program instruction that when executed by the one or more processors further cause the one or more processors to:

push identifying information of a resource onto the queue when the resource selection system receives a notification that the resource is available, and pop the identifying information of the first available resource off the queue in order for the resource selection system to provide the identifying information of the first available resource in response to the request for identifying information of an available resource.

\* \* \* \* \*